(No Model.)
B. SCARLES.
MECHANICAL MOVEMENT.
No. 380,666. Patented Apr. 3, 1888.
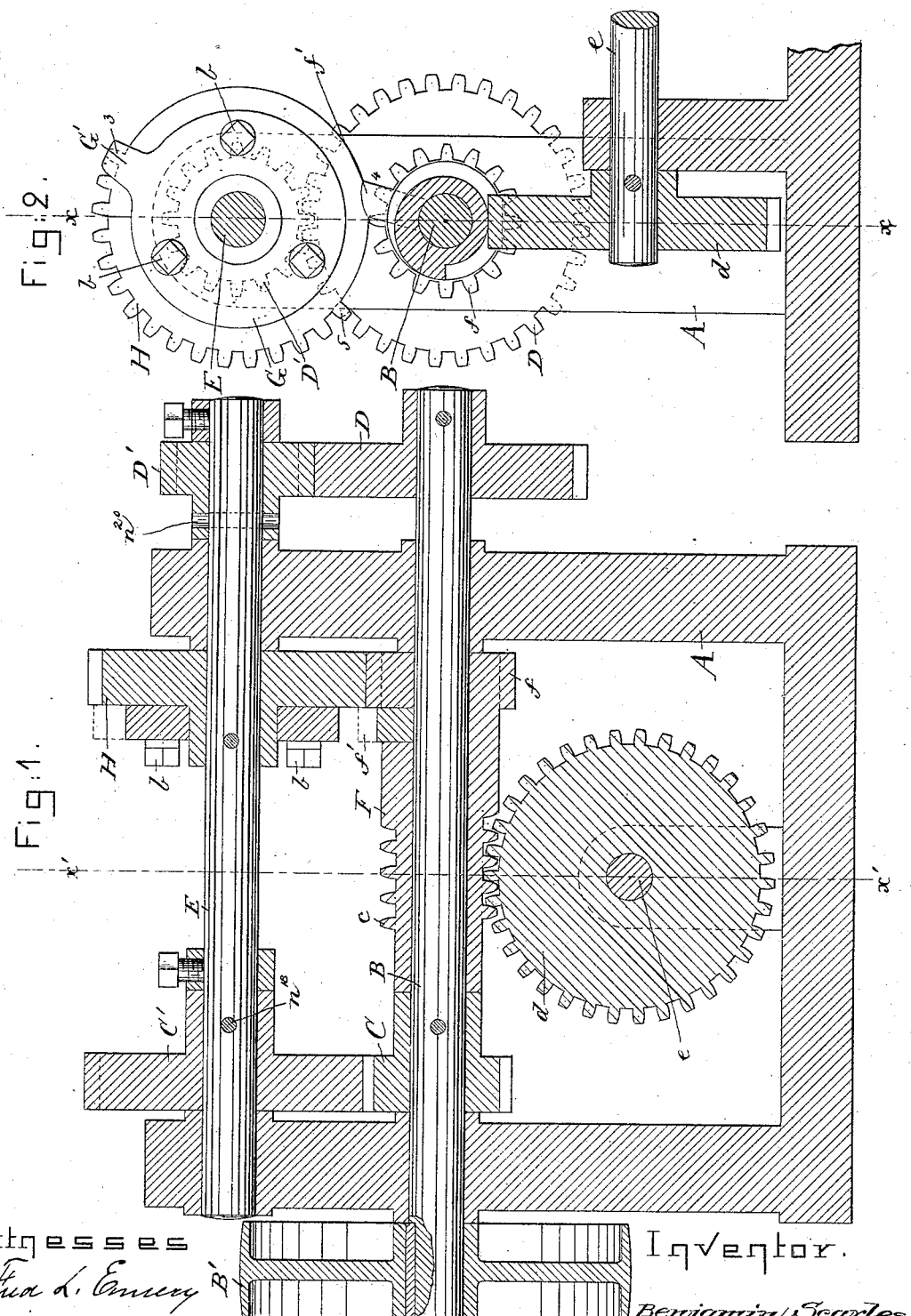
Witnesses
Fred L. Emery
John F. C. Prinkert
Inventor.
Benjamin Scarles
by Crosby & Gregory, attys.

UNITED STATES PATENT OFFICE.

BENJAMIN SCARLES, OF CLINTON, MASSACHUSETTS, ASSIGNOR TO THE CLINTON WIRE CLOTH COMPANY, OF SAME PLACE.

MECHANICAL MOVEMENT.

SPECIFICATION forming part of Letters Patent No. 380,666, dated April 3, 1888.

Application filed December 3, 1886. Serial No. 220,587. (No model.)

*To all whom it may concern:*

Be it known that I, BENJAMIN SCARLES, of Clinton, county of Worcester, and State of Massachusetts, have invented an Improvement in Mechanical Movements, of which the following description, in connection with the accompanying drawings, is a specification, like letters on the drawings representing like parts.

This invention has for its object to provide a mechanical movement whereby an intermitting rotation may be imparted to a shaft from a continuously-rotating shaft, the same being applicable, among other things, to machines for twisting wire.

In this invention a rotating shaft by suitable gearing rotates a second shaft having an attached mutilated gear and finger or projection which co-operates with a gear and another finger or projection upon a sleeve provided with a worm, the said worm engaging a toothed gear secured to a shaft. The finger moved in unison with the mutilated gear acts upon the finger 6, made to move with the sleeve and its pinion to insure the entrance of the leading tooth of the mutilated gear into a space between the teeth of the pinion to be engaged by the mutilated gear, thus avoiding such positions of the crowns of two teeth as would bring them together end to end. The gears on the shaft to which is attached the mutilated gear and finger are both loose on the said shaft; but either one of them may be pinned to the said shaft, as may be desired, the said gears being of different diameter, and by pinning one or the other to the shaft the said shaft is rotated at a faster or slower speed relatively to the driving-shaft parallel to it.

Figure 1, in vertical section on the line $x$, Fig. 2, shows a sufficient portion of a mechanical movement embodying my invention to enable the same to be understood; and Fig. 2 is a vertical cross-section in the line $x'$, Fig. 1, looking toward the right.

The frame-work A has suitable bearings for the reception of the shaft B, having at one end a belt or other pulley, B', for the reception of a belt by which the said shaft is rotated. The shaft B has fast upon it, as herein shown, a pinion, C, and a gear, D. The pinion C engages a toothed gear, C', on the shaft E, and if the shaft E is to be driven at a less rate of speed than the shaft B the gear C' is fast on the shaft E. The shaft B has fast on it a gear, D, which engages a pinion, D', which, when the gear C' is fastened to the shaft E, as by a pin, $n^{18}$, runs loose on the shaft E; but should it be desired to rotate the shaft E at a faster rate of speed than the shaft B, then the pin $n^{18}$ will be removed from the hub of the gear C' and the shaft E and will be inserted in the hole $n^{20}$, made in the hub of the gear D', and into a corresponding hole in the shaft E, thus fastening the pinion D' to and leaving the gear C' loose on the shaft E. If the speed of the shaft E with relation to the shaft B is always to be the same, then the said difference can be gained with the pinion C and gear C' and the pinion and gear D' and D may be omitted. The gears D D' may, however, be omitted, if desired.

The shaft E has fast upon it a hub, G, having a projecting finger, G', and the said hub has secured to it by suitable bolts, $b$, a mutilated gear, H, or a gear provided with teeth on about one-half of its periphery.

The shaft B has loose upon it a sleeve, F, provided with a worm, $c$, which engages the teeth of a worm-gear, $d$, fast on the shaft $e$, which is to be rotated intermittingly.

The sleeve F has at one end a pinion, $f$, and back of the pinion the sleeve has a projecting finger, $f'$.

In the rotation of the shaft E the finger or projection G' meets the finger or projection $f'$, and so moves the pinion $f^3$ that the leading tooth 3 (shown by dotted lines, Fig. 2) of the mutilated gear H enters a space, 4, between two teeth of the pinion $f$, and the mutilated gear having engaged the pinion $f$ the sleeve is rotated by the mutilated gear until the tooth 5 thereof runs out of mesh from the pinion $f$, when the sleeve F and shaft $e$ are stopped, and remain at rest until in the further continued rotation of the shaft E the finger or projection G' again strikes the finger or projection $f'$.

I claim—

1. In a mechanical movement, the rotating shaft B, the continuously-rotating shaft E, a pinion and gear to connect them and the gear $d$, and the sleeve F, having the worm and the pinion $f$ and finger $f'$, combined with a mutilated gear and finger or projection attached to and moving with the continuously-rotating shaft E, the combination operating substantially as described, to rotate the gear $d$ and its shaft intermittingly.

2. The shaft $e$, its attached gear $d$, the sleeve F, having the worm $c$, the pinion $f$, and finger or projection $f'$, and the shaft E, the pinion D', and toothed gear C' thereon, the shaft B, to support the said sleeve and the pinion C, and toothed gear D, attached to the said shaft, combined with the mutilated gear and the finger or projection rotated in unison with the said shaft E, the pinion D' and gear C' being the one loose and the other fast, substantially as described, on the said shaft E, according to whether or not the shaft E is to be rotated at a speed faster or slower than the shaft B, as set forth, to operate all substantially as described.

In testimony whereof I have signed my name to this specification in the presence of two subscribing witnesses.

BENJAMIN SCARLES.

Witnesses:
BURT CHELLIS,
JOHN W. FORRESTER.